United States Patent [19]

Kawachiya et al.

[11] Patent Number: 5,101,448
[45] Date of Patent: Mar. 31, 1992

[54] METHOD AND APPARATUS FOR PROCESSING A DOCUMENT BY UTILIZING AN IMAGE

[75] Inventors: Sachiko Kawachiya; Haruo Takeda, both of Kawasaki, Japan

[73] Assignee: Hitachi, Ltd., Tokyo, Japan

[21] Appl. No.: 397,117

[22] Filed: Aug. 21, 1989

[30] Foreign Application Priority Data

Aug. 24, 1988 [JP] Japan ................ 63-209975

[51] Int. Cl.$^5$ ................ G06K 9/20
[52] U.S. Cl. ................ 382/61; 382/46; 358/464
[58] Field of Search ................ 382/61, 54, 46; 358/464; 340/747

[56] References Cited

U.S. PATENT DOCUMENTS

| | | | |
|---|---|---|---|
| 4,533,959 | 8/1985 | Sakurai | 382/61 |
| 4,665,555 | 5/1987 | Alker et al. | 382/41 |
| 4,933,984 | 6/1990 | Nakano | 382/61 |

FOREIGN PATENT DOCUMENTS 62-138988 6/1987 Japan .

OTHER PUBLICATIONS

M. Nagao, "Pattern Information Processing", edited by The Institute of Electronics and Communication Engineers of Japan and published by Corona Co. Ltd., pp. 84-85. (English translation unavailable to applicants' attorney).

Primary Examiner—Leo H. Boudreau
Assistant Examiner—Steven P. Klocinski
Attorney, Agent, or Firm—Fay, Sharpe, Beall, Fagan, Minnich & McKee

[57] ABSTRACT

A document processor for processing a document image which includes both a table formed by a plurality of ruled lines, and characters to generate vector data defining the ruled lines comprises an image input device for reading an image of the document, a display for displaying the document image and a processor for processing the document image. The processor corrects a skew of the input document image, detects a successive black pixel area included in the skew-corrected image, detects a character area based on a size of a rectangle which circumscribes the successive black pixel area, and converts the image to a second document image having characters deleted and including only the ruled lines. Those line segments detected by horizontally scanning the second document image which are longer than a predetermined threshold are determined as horizontal temporary lines, and those segments detected by vertically scanning the second document image which are longer than a predetermined threshold are determined as vertical temporary lines, and data defining positons and sizes of those lines are stored. A plurality of horizontal temporary lines which are adjacent to each other are consolidated into one solid line and defining data for the horizontal ruled lines are determined. Similarly, a plurality of vertical temporary lines are consolidated and defining data for the vertical ruled lines are determined.

8 Claims, 18 Drawing Sheets

FIG. 2A FIG. 2B FIG. 2C FIG. 2D
FIG. 2E FIG. 2F FIG. 2G

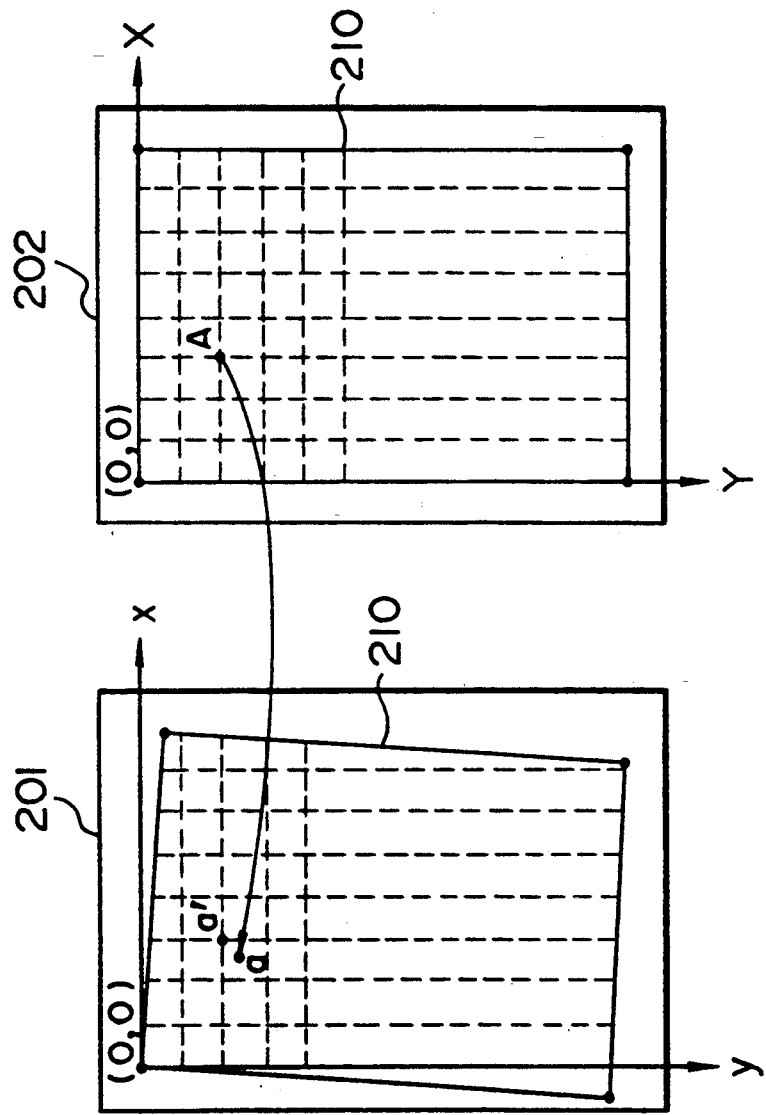

FIG. 8
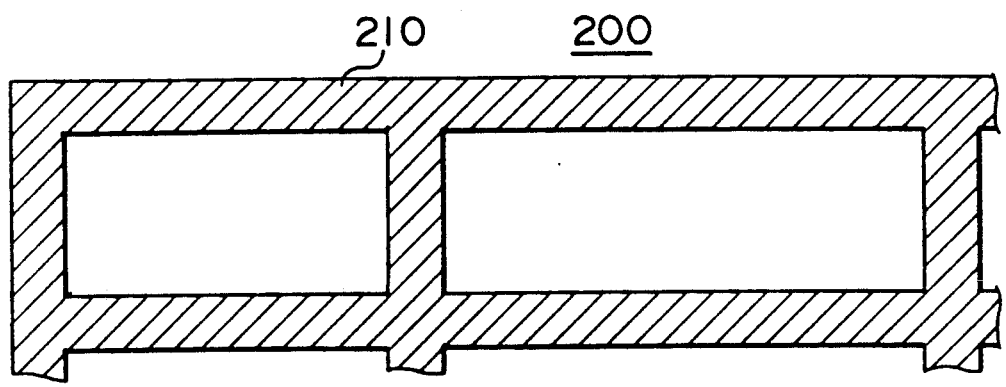
FIG. 9A
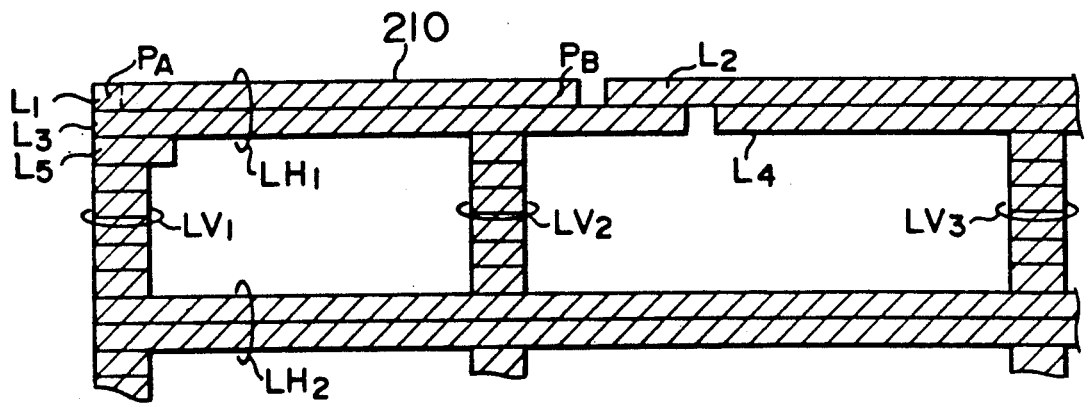
FIG. 9B

TEMPORARY LINE TABLE          24

| LINE NO. | COORDINATE (x, y) | | WIDTH | LENGTH |
|---|---|---|---|---|
| | START POINT | END POINT | | |
| 1 | (1, 1) | (4, 1) | 1 | 3 |
| 2 | (1, 2) | (4, 2) | 1 | 3 |
| 3 | (1, 3) | (5, 3) | 1 | 4 |
| 4 | (10, 4) | (14, 4) | 1 | 4 |
| ⋮ | ⋮ | ⋮ | ⋮ | ⋮ |

24N  24S  24E  24W  24L

FIG. 15
| CASE NO. | RELATION OF OVERLAPPED LINES | DEFINITION OF ABSCISSA OF END POINTS |
|---|---|---|
| 1 | 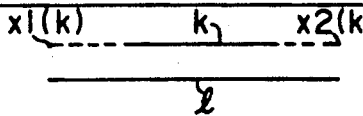 | $x1(k) = x1(\ell)$<br>$x2(k) = x2(\ell)$ |
| 2 | 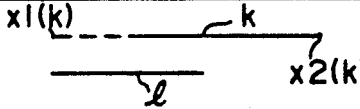 | $x1(k) = x1(\ell)$<br>$x2(k) = x2(k)$ |
| 3 | 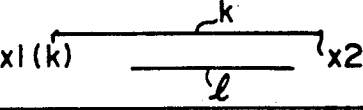 | $x1(k) = x1(k)$<br>$x2(k) = x2(k)$ |
| 4 | 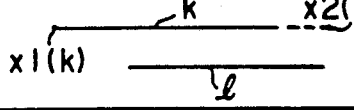 | $x1(k) = x1(k)$<br>$x2(k) = x2(\ell)$ |
FIG. 16
| CASE NO. | RELATION OF OVERLAPPED LINES | DEFINITION OF LINE WIDTH OF CONSOLIDATED LINE |
|---|---|---|
| 1 | 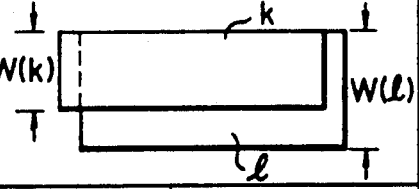 | $W(k) = W(\ell)$ |
| 2 | 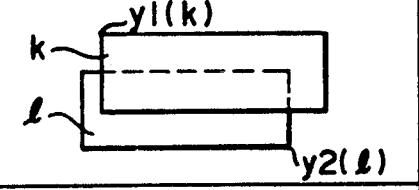 | $W(k) = y2(\ell) - y1(k) + 1$ |
| 3 | 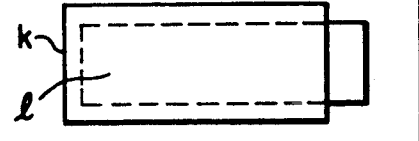 | $W(k) = W(k)$ |
W : WIDTH

| LINE NO. | COORDINATE (x,y) | | WIDTH | LENGTH |
|---|---|---|---|---|
| | START POINT | END POINT | | |
| 1 | ( 1, 1) | ( 5, 1) | 3 | 4 |
| 2 | (-1, 2) | ( 4, 2) | 1 | 3 |
| 3 | (-1, 3) | ( 5, 3) | 1 | 4 |
| 4 | (10, 4) | (14, 4) | 1 | 4 |
| ⋮ | ⋮ | ⋮ | ⋮ | ⋮ |

24

| LINE NO. | COORDINATE (x,y) | | WIDTH | LENGTH |
|---|---|---|---|---|
| | START POINT | END POINT | | |
| 1 | ( 1, 1) | ( 5, 1) | 3 | 4 |
| 2 | (10, 4) | (14, 4) | 1 | 4 |
| ⋮ | ⋮ | ⋮ | ⋮ | ⋮ |

22

22S  22E  22W  22L

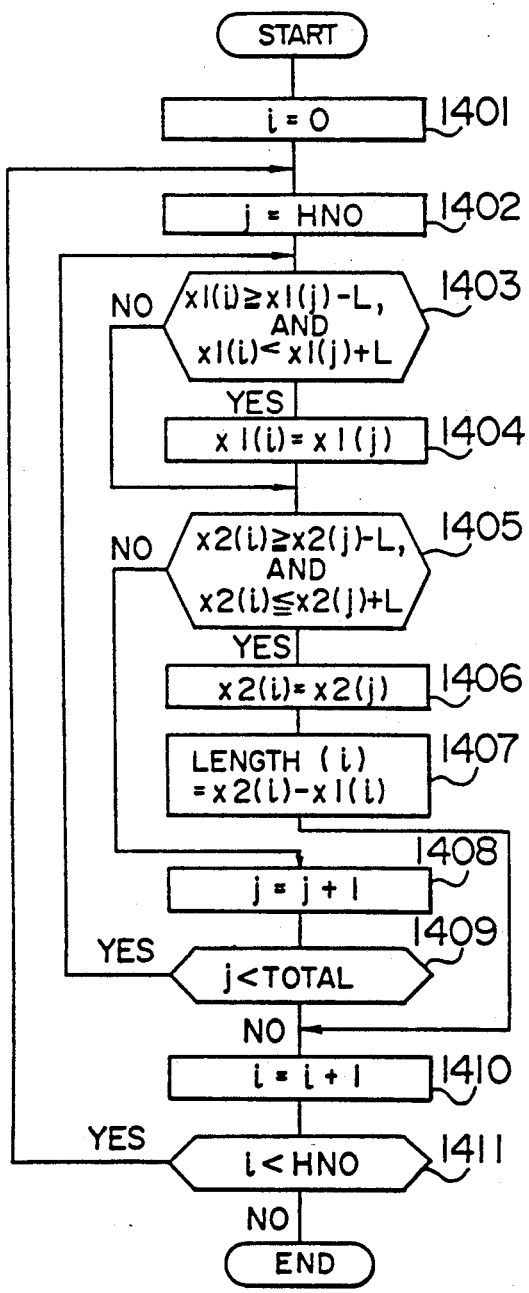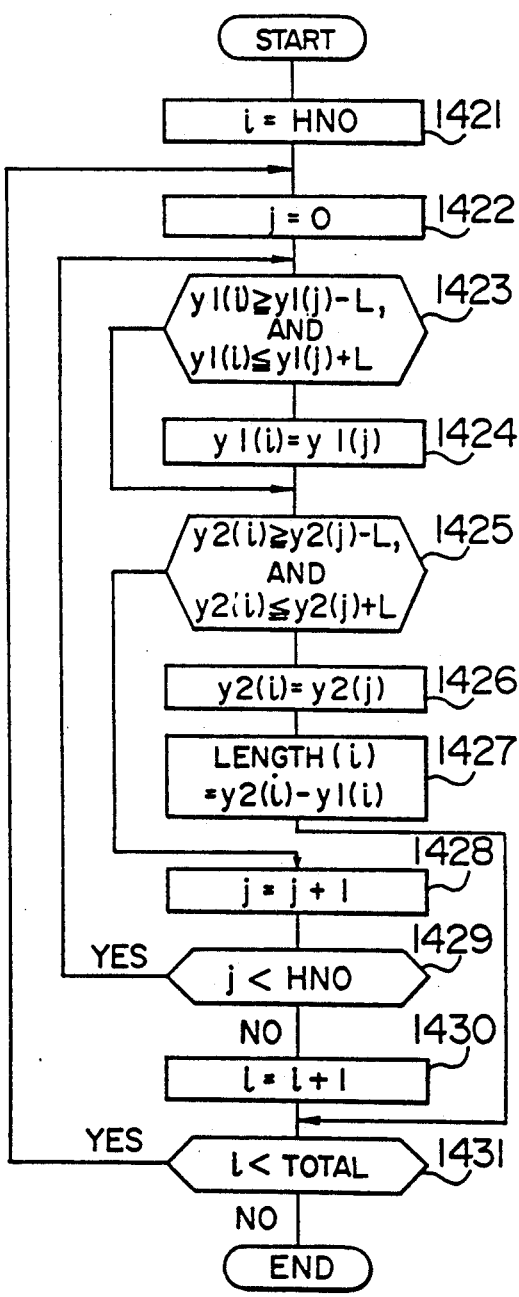

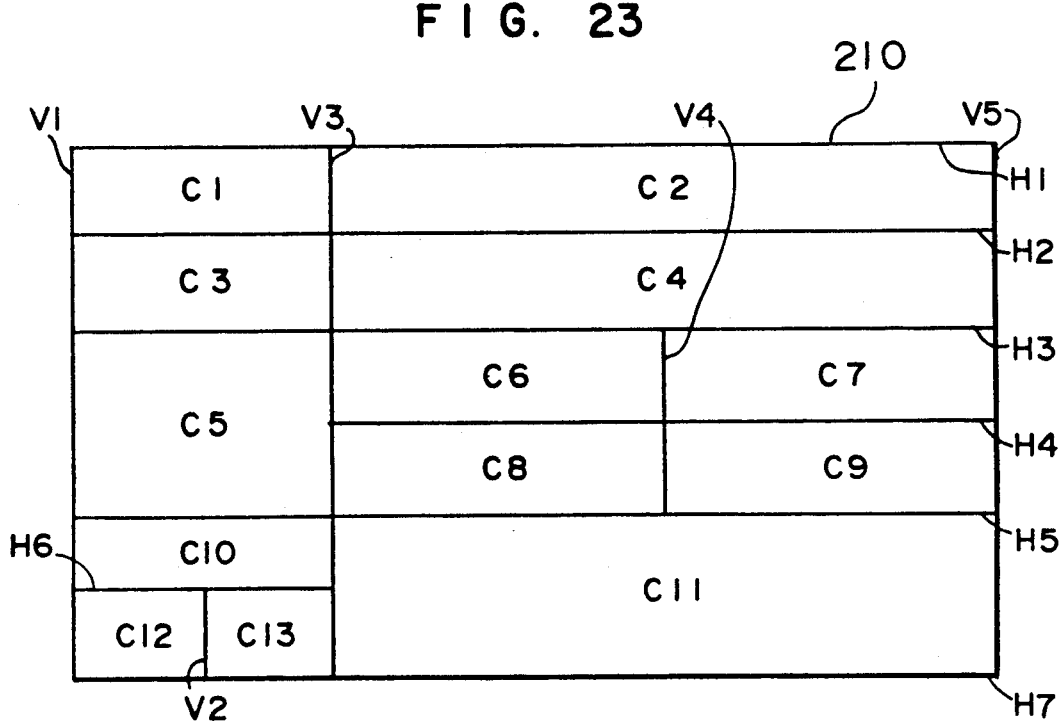

FIG. 26

| CELL NO. | COORDINATE | |
| --- | --- | --- |
| | START POINT (CELL-x1, CELL-y1) | END POINT (CELL-x2, CELL-y2) |
| 0 | ( 1 , 1 ) | ( 15 , 8 ) |
| 1 | ( 1 , 10 ) | ( 15 , 18 ) |
| 2 | ( 1 , 20 ) | ( 15 , 28 ) |
| 3 | ( 1 , 30 ) | ( 15 , 38 ) |
| ⋮ | ⋮ | ⋮ |

23N  23S  23E  23

METHOD AND APPARATUS FOR PROCESSING A DOCUMENT BY UTILIZING AN IMAGE

BACKGROUND OF THE INVENTION

1. Field of the Invention

The present invention relates to method and apparatus for processing a document, and more particularly to method and apparatus for processing a document data by recognizing ruled lines from a document image which includes a table comprising a plurality of ruled lines, and characters, to extract data for preparing a table.

2. Description of the Related Art

In a document processing apparatus such as word processor or workstation, a document which includes a table is usually prepared by selecting a ruled line mode, specifying a start point and an end point of the ruled line by a cursor to draw the ruled line, and repeating the above step for each of a plurality of vertical and horizontal ruled lines. In some apparatus, the start point is specified by a cursor, a ruled line extending rightward or downward from the start point is drawn, the end point is then specified by a cursor and an unnecessary portion of the ruled line extending rightward or downward beyond the end point is erased so that the ruled line of a desired length is drawn. When characters are to be written in a frame of the table thus prepared or in a predetermined section in the table, the ruled line mode is reset to return the apparatus mode to a character input mode and the characters are inputted by manipulating character keys and cursor key.

One method of eliminating a troublesome operation in preparing a table is disclosed in JP-A-62138988 in which a table which has been clearly hand-written on a plain paper is read by an image input device, and the inputted table image is recognized by utilizing a knowledge base which stores special knowledge for table recognition in order to automatically generate a framework of the table.

SUMMARY OF THE INVENTION

The prior art apparatus for generating the table by utilizing the input image recognizes the table on the assumption that the input image comprises a plurality of ruled lines. Thus, a form comprising an existing slip or document in which characters and a table coexist cannot be used with the apparatus as a document sheet.

It is an object of the present invention to provide method and apparatus for processing a document which uses a document including a table having a plurality of ruled lines and a plurality of characters written inside or outside the table, as a document sheet, and the ruled lines are recognized from the document image read by the image input device so that the ruled lines are drawn automatically.

It is another object of the present invention to provide method and apparatus for processing a document which processes a document image having a portion of a ruled line deteriorated or having vertical and horizontal ruled lines not exactly crossing to generate a table comprising sharp ruled lines having correct cross points.

It is another object of the present invention to provide method and apparatus for processing a document which recognizes ruled lines from a document image including a plurality of ruled lines and characters and generates ruled line data in a form which permits an operator to amend or add the ruled lines by a word processing function.

It is a further object of the present invention to provide method and apparatus for processing a document which recognizes ruled lines and sections enclosed by those ruled lines from a document image including a plurality of ruled lines and character strings to generate ruled line defining data and section defining data.

In order to achieve the above objects, the present invention provides a method for processing a document in a document processor having image input means and display means, comprising:

a first step of converting a document including a plurality of characters and a table having a plurality of vertical and horizontal ruled lines into a document image by said image input means;

a second step of converting the document image into a second document image including only the ruled lines;

a third step of recognizing the ruled lines included in the second document image to generate vector data defining the ruled lines; and a fourth step of supplying a table containing a plurality of ruled lines drawn based on the vector data to said display means.

More specifically, the second step includes a step for determining a circumscribed rectangle of a successive black pixel area included in the document image, and a step for substituting black pixels located in the circumscribed rectangle having smaller size than a predetermined size on the document image, with white pixels.

The third step includes a step for extracting a plurality of horizontal ruled lines from the second document image to generate vector data representing start points, end points and line widths of the horizontal ruled lines, and a step for extracting a plurality of vertical ruled lines from the second document image to generate vector data representing start points, end points and line widths of the vertical ruled lines.

The horizontal lines are extracted by excluding from a plurality of line segments each having one or more black pixels, detected by horizontally scanning the second document image sequentially, those line segments which are shorter than a predetermined threshold.

The vertical ruled lines are extracted by excluding from a plurality of line segments each having one or more black pixels, detected by vertically scanning the second document image sequentially, those line segments which are shorter than a predetermined threshold.

The vector data for the horizontal ruled lines are generated by consolidating those line segments detected by the horizontal scan and having longer lengths than the predetermined threshold, which are in adjacent positional relationships into one line segment having increased line width and/or line length and detecting a start point, an end point and a line width of the consolidated line segment.

Similarly, the vector data of the vertical ruled lines are generated by consolidating those line segments detected by the vertical scan and having longer lengths than the predetermined threshold, which are in adjacent positional relationship, into one line segment having increased line width and/or line length and detecting a start point, an end point and a line width of the consolidated line segment.

Another feature of the method for processing a document in the present invention is a step of detecting a skew of the document image produced in the first step and correcting the skew which is caused in an inputting of the document image. The second step is carried out for the skew-corrected document image.

In order to correct the projecting portions of the ruled lines, vector data representing the vertical ruled lines and vector data representing the horizontal ruled lines of the vector data generated in the third step are compared, and start points or end points are selectively corrected.

In accordance with the present invention, by drawing the ruled lines based on the above vector data, a sharp table comprising deterioration free ruled lines can be outputted to the display screen and the printer.

In order to allow an operator to specify any section in the displayed table by a cursor and input character data into that section, section defining data to determine which section the cursor is located in is necessary. In accordance with the present invention, the defining data for the sections in the table is generated by sequentially detecting vertical lines crossing a reference line which may be the top horizontal line, based on the vector data having the projecting portions of the ruled lines corrected, sequentially detecting horizontal lines crossing those vertical lines, determining position data of a plurality of sections in a first line having the reference line as a upper side segment, and detecting sections in a second line in the same manner by using the second horizontal line as the reference line.

An apparatus of the present invention for processing a document by processing an image of the document including a table having a plurality of ruled lines, and characters to generate vector data defining the ruled lines, comprises:

an image input device for inputting a document image including the table and the characters;

display means having a screen for displaying the document image;

first memory means for storing the document image having a plurality of pixels inputted by said image input means;

second memory means for storing a skew-corrected document image;

third memory means for storing vector data defining the ruled lines;

operator-manipulated means for inputting a command and character data;

data processing means operable in response to a command from said input means;

said data processing means having first means for detecting a skew of the document image stored in said first memory means to write a skew-corrected document image into said second memory means, second means for substituting black pixels constituting the characters with white pixels to convert the document image stored in said second memory means to a second document image in which a plurality of ruled lines remain, and third means for detecting a horizontal ruled line group and a vertical ruled line group separately from the second document image and writing vector data defining the positions and the sizes of the ruled lines into said third memory means; and means for outputting the table having the ruled lines drawn based on the vector data to said display means. The foregoing and other objects, advantages, manner of operation and novel features of the present invention will be understood from the following detailed description when read in connection with the accompanying drawings.

BRIEF DESCRIPTION OF THE DRAWINGS

FIGS. 2A-2G illustrate a change in a document image in the document processing by the present invention, FIG. 6 illustrates a skew correction routine 303 for the document image in FIG. 3, FIGS. 7A and 7B illustrate a detection method for a character area in the document image, FIG. 8 shows a character circumscribed rectangle table, FIGS. 9A and 9B show ruled lines included in an original document and deteriorated ruled lines included in an inputted document image, respectively, FIGS. 21A and 21B show detailed flow charts of a horizontal line modification routine and a vertical line modification routine, respectively, of a crosspoint processing routine 310 of FIG. 3, FIG. 23 illustrates a relationship between a ruled line and a section (cell) in a table, FIG. 24 shows a sequence of detection of sections, FIG. 26 shows an example of a section defining table 23.

DESCRIPTION OF THE PREFERRED EMBODIMENTS

Figure 1:
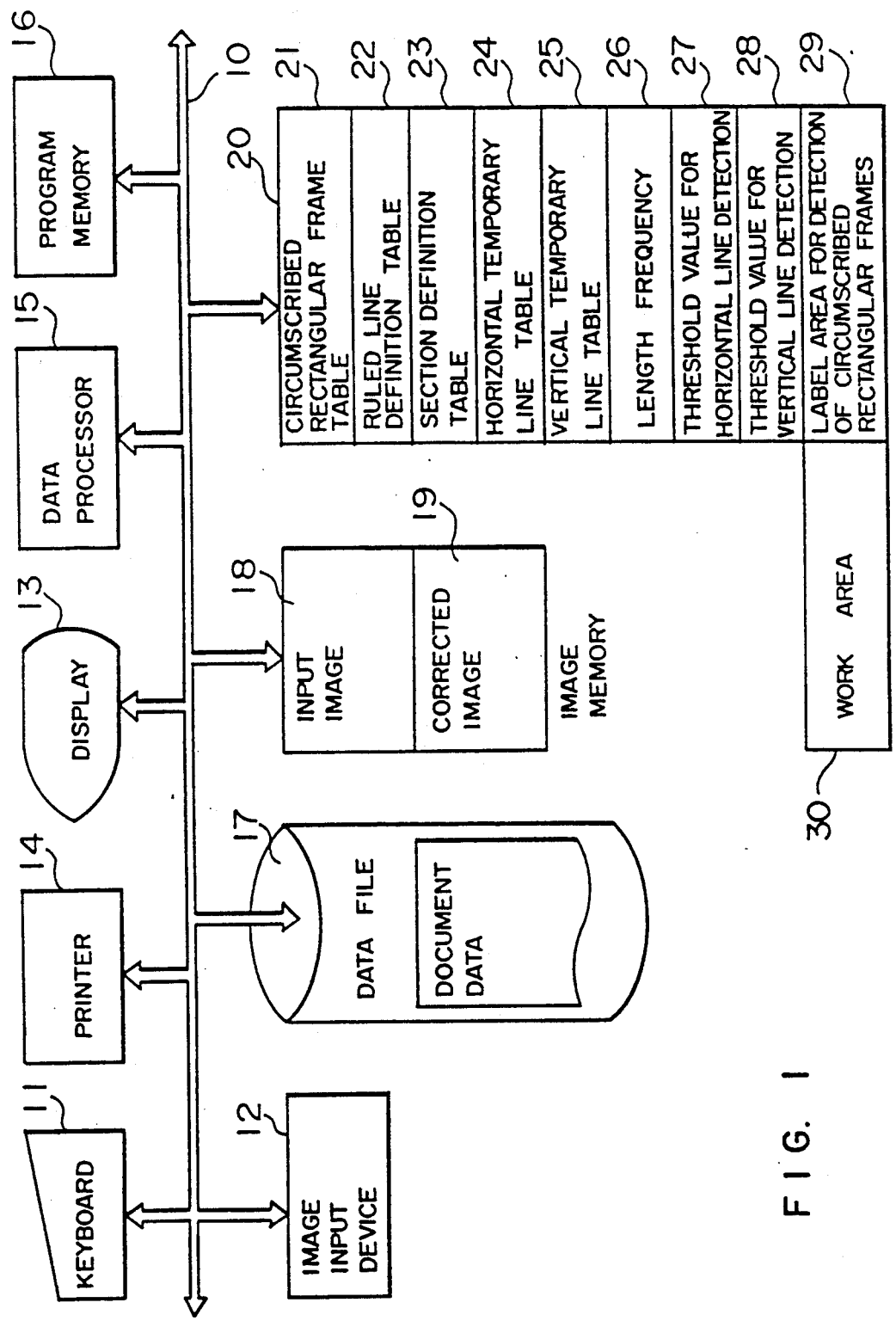
FIG. 1 shows an overall configuration of a document processing apparatus of the present invention.

FIG. 1 shows an overall configuration of a system which implements the document processing method of the present invention. The system comprises a keyboard 11 by which an operator inputs a command or data, an image scanner 12 by which a document image such as a slip image is entered, a display 13 for displaying an input document or document data recognized by the system, a printer 14, a data processor 15 which processes data in accordance with a program stored in a program memory 16, a document data file 17 for storing vector data (line segment data and section data) and character data generated by the document recognition, an input buffer memory 18 for temporarily storing the image data inputted by the image input device 12, a memory 19 for storing corrected image data generated by processing the image data stored in the input buffer memory 18, and a memory 20 for storing various tables and work data necessary for the document recognition of the present invention. The memory 20 comprises a table area 21 for storing data which defines a circumscribed rectanglar frame of successive black pixel area detected from the document image, a table area 22 for storing data which defines ruled lines included in the document, a table area 23 for storing data which defines sections of the table included in the document, a horizontal temporary line data table area 24 and a vertical temporary line data table area 25 to be used for correcting a distorted ruled line, a line length frequency table area 26 used to discriminate a horizontal ruled line and a vertical ruled line, an area 27 for storing a threshold for detecting a horizontal line, an area 28 for storing a threshold for detecting a vertical line, an area 29 for storing label data to be used to detect a circumscribed rectanglar frame, and a work area 30.

FIGS. 2A to 2G schematically show steps of document recognition in the present invention.

Figures 2A, 2B, 2C, 2D, 2E, 2F, 2G:
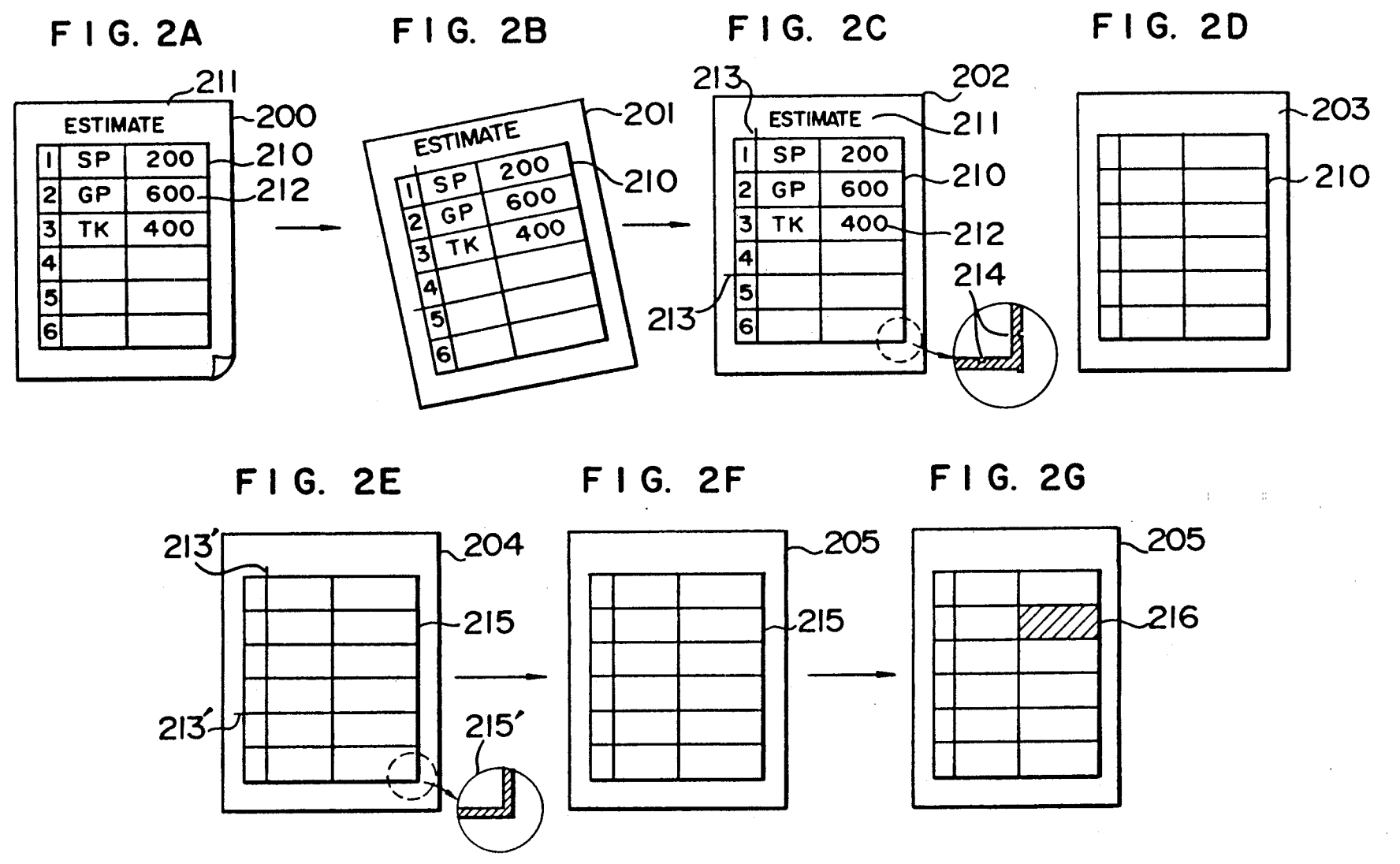

FIG. 2A shows an original slip form 200 to be processed. The slip includes ruled lines 210, a heading character string 211 and character data 212 written in sections. FIG. 2B shows input image data 201 of the slip read into the input image buffer 18 by the image input device 12. The input image data 201 is inclined with respect to the horizontal (or vertical) direction due to inaccurate setting of the sheet onto the input device 12 by an operator. FIG. 2C shows image data 202 generated by detecting linear lines (portions of ruled lines) included in the input image 201 and correcting the inclination. The image data 202 includes defects such as projection 213 and dropout 214 at portions of the ruled lines due to print dirt which is present on the original sheet (slip) and a noise generated during the conversion in the image input device 12.

FIG. 2D shows image data 203 which includes only ruled line information 210 which is produced by detecting successive black pixel areas included in the input image 202, determining a circumscribed rectangular frame for the successive black pixel areas, recognizing a character frame from a size of the circumscribed rectangular frame, and eliminating character information 211 and 212.

FIG. 2E shows a graphic data image 204 prepared by detecting the horizontal lines and vertical lines from the image data 203, determining vector data of the line segments and drawing the image based on the vector data. The horizontal line is detected by sequentially scanning the image data 203 horizontally to detect a temporary line consisting of a plurality of pixels which are successive on one scanning line, excluding the temporary line having less than a predetermined number of successive pixels because it is a vertical ruled line, and detecting the remaining temporary ruled lines as the horizontal ruled lines. A plurality of adjacent temporary lines are consolidated into one solid line and vector data of the horizontal ruled lines are determined from the start point and the end point. Similarly, the vector data of the vertical line is determined by vertically scanning the image data 203, detecting a vertical temporary line comprising more than a predetermined number of successive pixels on one scan line, and consolidating adjacent temporary lines. As a result of the above image processing, the ruled line comprises a linear line having a dropout corrected as shown in a circle 215' but it is still not perfect because a crosspoint of the vertical line and the horizontal line partially projects or is not connected.

FIG. 2F shows a graphic data image 205 drawn by correcting the graphic data image 204 to produce corrected vector data in which the projection has been eliminated, the vertical lines and the horizontal lines correctly cross and the ruled lines have a predetermined uniform width.

In FIG. 2G, a section (for example, a hatched area 216) defined by vertical and horizontal ruled lines is recognized and section defining data necessary to determine a section at a position designated by a cursor by an operator.

Figure 3:
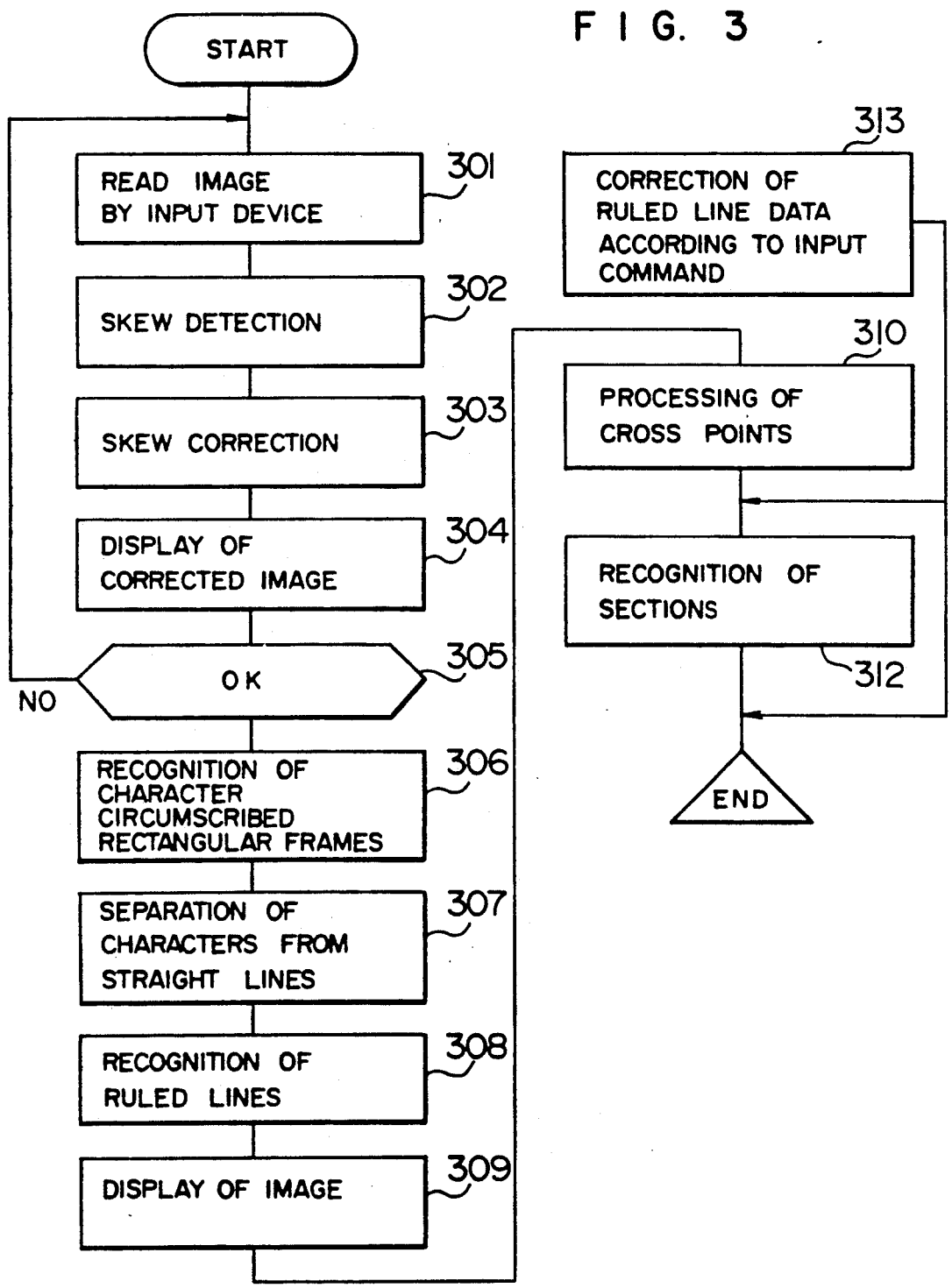
FIG. 3 shows a general flow chart of a program for carrying out the document processing of the present invention.

FIG. 3 shows a flow chart of a processing program for recognizing the document.

Figure 4:
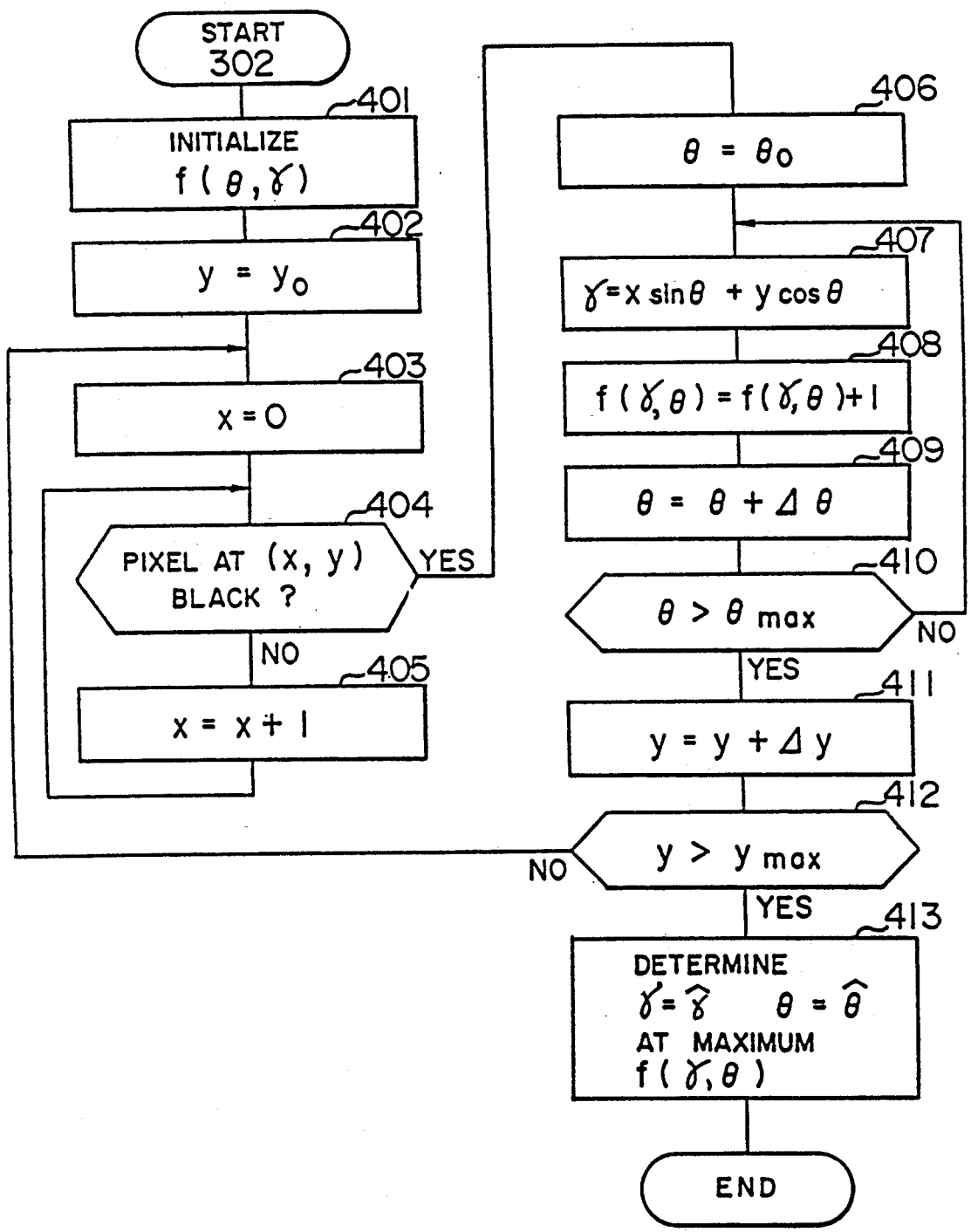
FIG. 4 shows a detailed flow chart of a skew detection routine 302 in FIG. 3.
Figure 5:
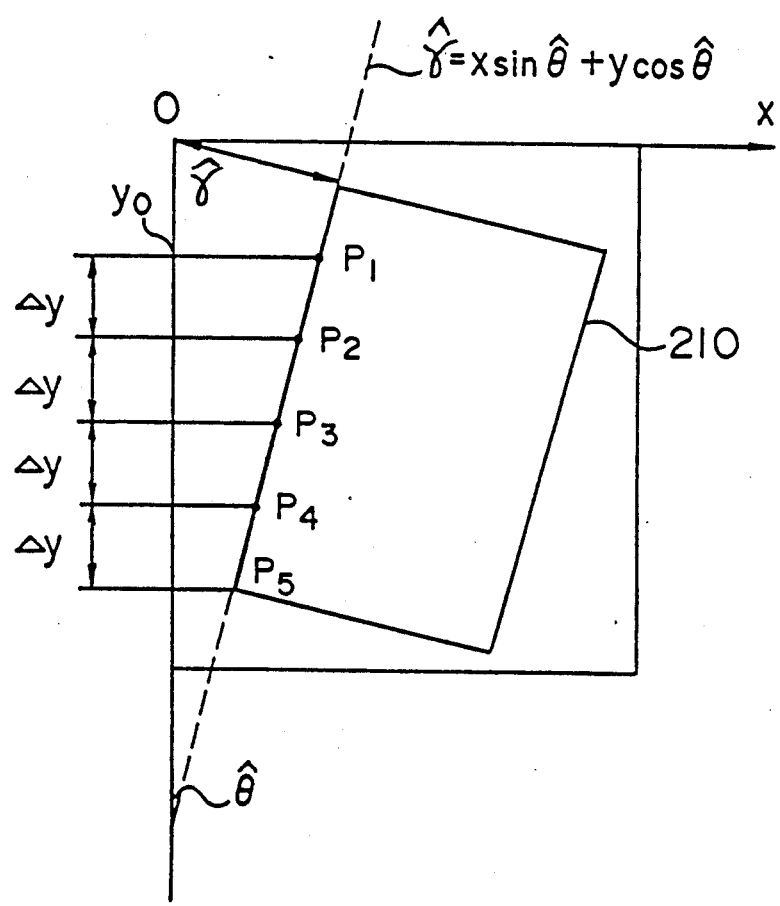
FIG. 5 illustrates skew detection of the document image.

In this program, image information of an input slip 200 is read into the input image buffer memory 18 by the image input device 12 (step 301). Then, a skew of the input image 201 to be described later with reference to FIGS. 4 and 5 is detected by utilizing a ruled line 210 (step 302), and the skew-corrected image data 202 is stored in the image data area 19, as will be explained in connection with FIG. 6 (step 303). The skew-corrected image data 202 is supplied to the display 13 (step 304) so that the operator (user) may visually check the displayed image. The operator monitors the displayed image to determine whether to reenter the slip image or not, and if the displayed skew-corrected image is okay, the operator inputs an OK command from the keyboard 11. If the OK command is inputted (step 305), a circumscribed rectangle of a black pixel successive area included in the image data 202 is determined to recognize a frame which circumscribes the characters (step 306). Then, the character information and ruled line (linear line) information are separated and the image 203 shown in FIG. 2D in which the characters have been eliminated from the image data 202 is produced (step 307). Then, as will be described in detail with reference to FIGS. 9A to 20, the horizontal lines and vertical lines are detected from the ruled lines included in the image data 203 to generate vector data of the line segments (step 308), and the graphic data image 204 shown in FIG. 2E which is drawn based on the above vector data is displayed on the display screen (step 309). As will be described in detail with reference to FIG. 21, the crosspoints of the ruled lines included in the image 204 are corrected and the line widths are unified to produce the corrected graphic data image 205 shown in FIG. 2F (step 310). For the graphic data image 205, sections are recognized as will be explained with reference to FIGS. 22-26 (step 312). For the graphic data image 204 or 205, the operator may correct the ruled lines through the keyboard as shown by a step 313. In this case, the vector data of the line segments is modified, erased or added in accordance with an operation command issued by the operator.

Major steps in the flow chart are now explained in detail.

In the skew detection of the step 302, one of the ruled lines (straight lines) included in the input image 201 is detected and the skew of the line is determined. The straight line included in the image may be detected in a known method. In the present embodiment, a known Hough conversion algorithm is used.

FIG. 4 shows a program flow chart for detecting a ruled line corresponding to a left side, and FIG. 5 illustrates it. In FIG. 5, an equation of the desired straight line is given by $\gamma = x \cdot \sin\theta + y \cdot \cos\theta$ where $\gamma$ is a distance from an origin point O and $\theta$ represents a skew of the line A feature of the Hough conversion system is the ability of detecting the straight line without being affected by other information in the image such as characters. In the flow chart of FIG. 4, parameters are initialized in steps 401 and 402, one candidate point on the straight line, for example, a black pixel $P_1$ is searched in steps 403-406, sets of $\gamma$ and $\theta$ in $\gamma = x \cdot \sin\theta + y \cdot \cos\theta$ are determined as all straight lines which pass through the point $P_1$ in steps 407-411, and the steps 403-412 are repeated to determine a frequency distribution $f(\gamma, \theta)$, which represents the number of candidate points which are on the straight line $\gamma = x \cdot \sin\theta + y \cdot \cos\theta$. For example, in the example of FIG. 5, the value of $f(\gamma, \theta)$ is "4" for the straight line $(\gamma, \theta)$ which passes through the points $P_1$-$P_4$, but the value cf $f(\gamma, \theta)$ is 0-2 for other straight lines $(\gamma, \theta)$. In a step 413, $\gamma$ and $\theta$ which cause a maximum value of $f(\gamma, \theta)$ are determined so that parameters of the straight line which passes through most candidate points are determined.

In the skew correction of the step 303 of FIG. 3, a point A on the corrected image 202 is converted to the coordinates of a point a on the input image 201 as shown in FIG. 6 and a pixel density at a point a' which is closest to the point a is set as a pixel density of the point A. The above process is repeated for all points (pixels) on the corrected image. The coordinates of the point a corresponding to the point A may be calculated from the skew angle $\theta$ of the straight line determined in the step 302. The density at the point a may be calculated based on the densities of four pixels surrounding the point a and distances between the point a and those pixels.

The recognition of the character circumscribed rectangular frame in the step 306 of FIG. 3 is carried out in the following manner.

Figure 7A:
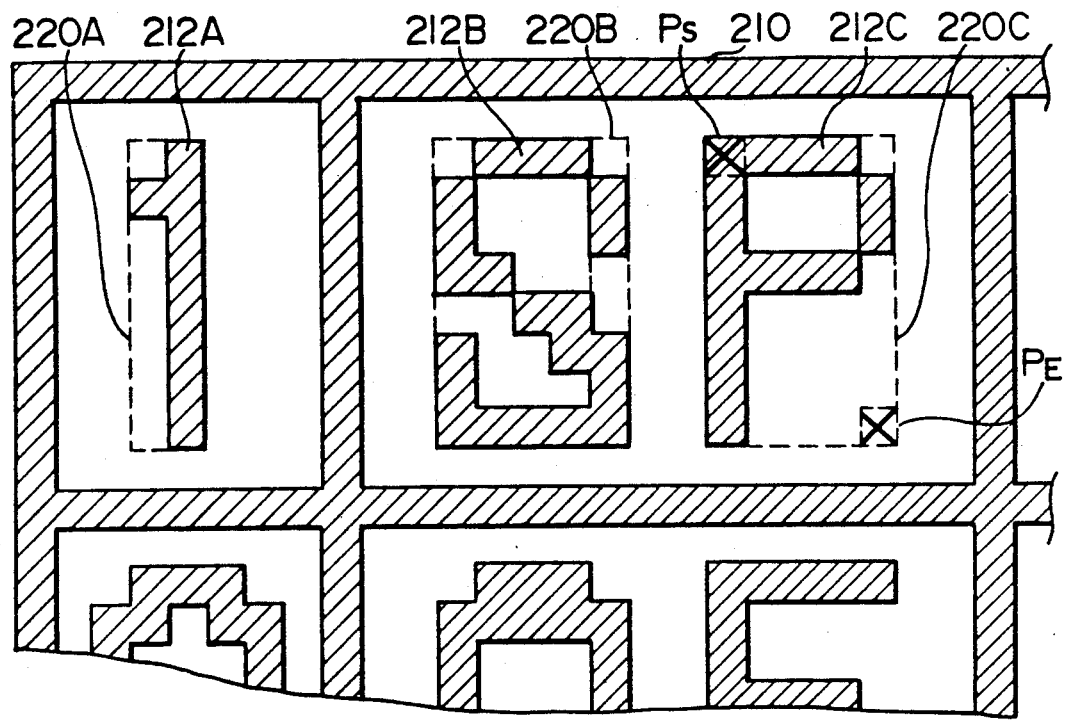

FIG. 7A is an enlarged view of the image 202 which includes a ruled line 210 and characters 212A-212C. The character circumscribed rectangular frame (character frame) as defined in the present invention means a rectangle which circumscribes a plurality of successive black pixels which constitute a character, as shown by 220A-220C. A start point and an end point of the character frame are shown by a left top pixel $P_S$ and a right bottom pixel $P_E$, respectively. The character circumscribed rectangular frame may be detected in a manner described in "Pattern Information Processing" by M. Nagao, edited by The Institute of Electronics and Communication Engineers of Japan and published by Corona Co. Ltd., pages 84-85. In this method, the image is sequentially scanned from the top line to the bottom line and from left to right in each line, and pixels are labeled sequentially so that the successive black pixels in each line have the same label (identification code).

Figure 7B:
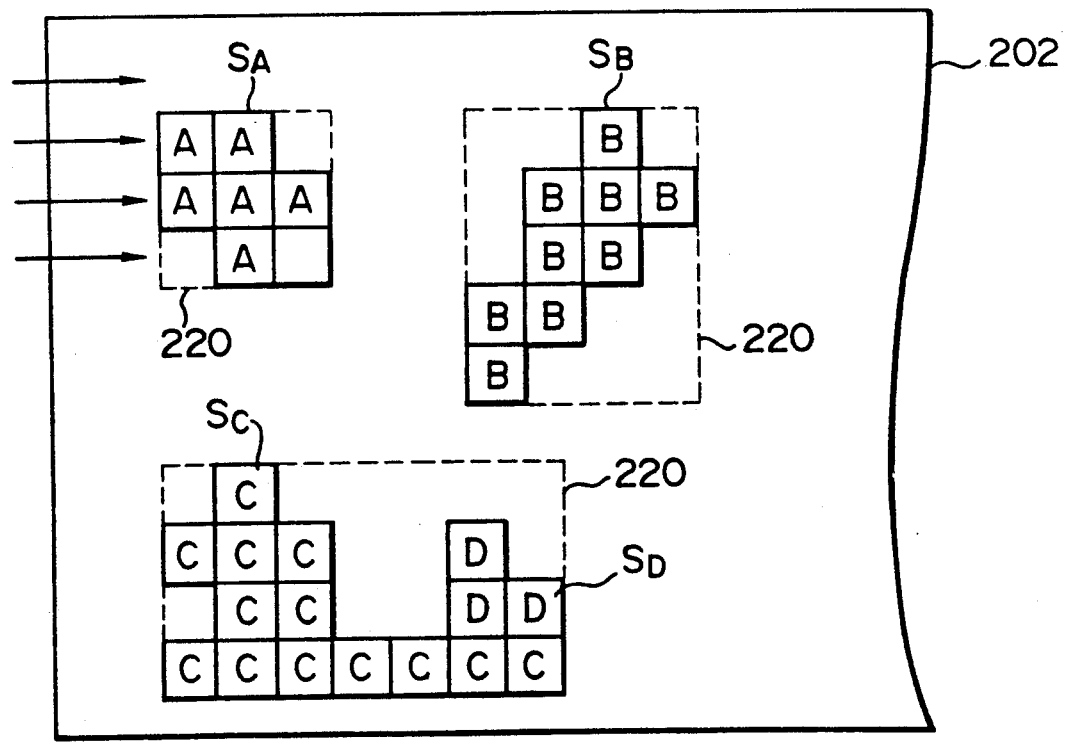

For example, as shown in FIG. 7B, the image 202 is sequentially scanned in the direction of arrow, the position of the black pixel which has been first detected is labeled with A, and the positions of the successive black pixels are labeled with A. If the black pixel discontinues and another black pixel appears in the same line, it is labeled with a different label B and the positions of the successive black pixels are also labeled with B. A relationship between the positions of the black pixels and the labels is stored in the memory area 29. In the next line, each time the black pixel is detected, whether there is a labeled point in a vicinity or not is checked. If there is, the same label as that of the labeled pixel is imparted, and if there is not, a new label is imparted. By labeling in this manner, sets $S_A$-$S_D$ of successive black pixels having the same labels are formed as shown in FIG. 7B. Where the sets having different labels are continuous such as the sets $S_C$ and $S_D$, it is necessary to unify the labels. Thus, at the end of the scan of the entire image 202, the memory area 29 is checked so that the label of the set $(S_D)$ which is continuous to other set $(S_C)$ is changed $(D \rightarrow C)$. A circumscribed rectangle 220 for each set of pixels having the same label is determined, and coordinates of a start point $P_S$ and an end point $P_E$ are stored into the circumscribed rectangular frame table 21 as shown in FIG. 8, in which numeral 21A denotes a rectangle number, numeral 21S denotes a start point coordinate and numeral 21C denotes an end point coordinate. The circumscribed rectangle data of the black pixels which constitute the characters and the circumscribed rectangle data of the black pixels which constitute ruled lines are stored into the circumscribed rectangle table 21. The size of the rectangle is determined based on the start point coordinate 21S and the end point coordinate 21C, and the rectangle which is smaller than a predetermined size is determined as the character circumscribed rectangle.

In the step 307 of FIG. 3, those black pixels included in the image 202 which are located in the character circumscribed rectangle are converted to white pixels. As a result, the image 203 in which only the ruled lines 210 remain is produced.

Detail of the ruled line recognition step 308 of FIG. 3 is now explained with reference to FIGS. 9A to 20.

FIG. 9A shows an enlarged view of original ruled lines 210 on an original slip 200 before it passes through the image input device 12. The original ruled lines 210 are sharp and have no distortion in the line width.

FIG. 9B shows an enlarged view of the ruled lines 210 included in the image 203 read by the image input device 12 and having characters deleted. The ruled lines 210 have been somewhat deteriorated due to noise so that a portion of the successive black pixels has been dropped out.

In the ruled line recognition step 308, data for drawing the deterioration free ruled lines shown in FIG. 9A is produced based on the deteriorated ruled lines shown in FIG. 9B.

In the present invention, it comprises a routine 500 for recognizing horizontal lines (for example, LH1, LH2, ...) in the ruled lines 210, a routine 510 for recognizing vertical lines (for example, LV1, LV2, ...) and a routine 520 for preparing a ruled line table (solid line list).

Figure 11:
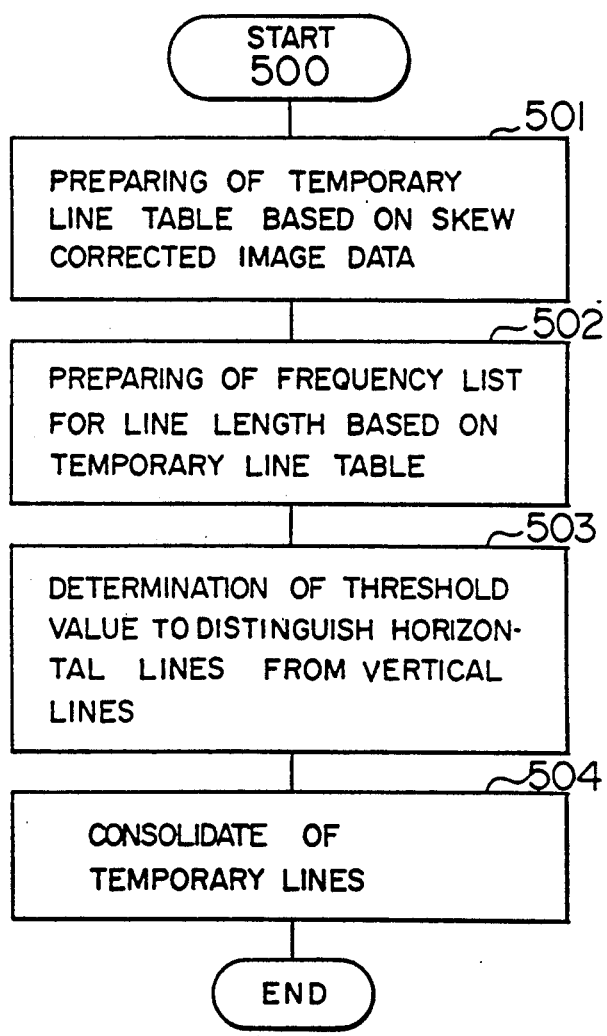
FIG. 11 shows a detailed flow chart of a horizontal line recognition routine 500 of FIG. 10.

Detail of the horizontal line recognition routine 500 is shown in FIG. 11. In this routine, temporary lines included in the image 203 are first extracted to prepare a temporary line table 24 (step 501). In the present invention, the "temporary line" means a line segment comprising a plurality of successive black pixels on a horizontal scan line and having a line width equal to one pixel width, such as line L1, L2, ... shown in FIG. 9B.

One ruled line comprises a plurality of temporary lines depending on the line width of the ruled line. In the step 501, the image 203 is horizontally scanned to detect a start point (for example $P_A$) and an end point (for example, $P_B$) of a line segment comprising a plurality of successive black pixels on each scan line, and coordinates of those two points, line width (=one pixel width) and line length (distance between $P_A$ and $P_B$) are sequentially registered in the table 24 shown in FIG. 12. After the entire image 203 has been scanned, all temporary line data 24S-24L for the horizontal ruled lines as well as the vertical ruled lines are registered in the table 24 together with the line numbers 24N which represent the sequence of detection of the temporary lines.

Figures 12, 13:
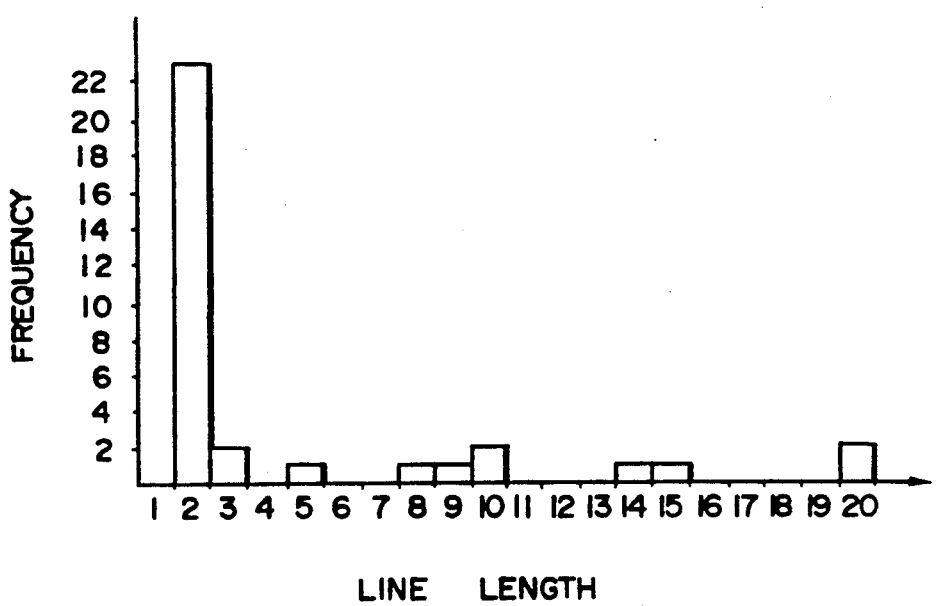
FIG. 12 shows a table for storing temporary line defining data.
FIG. 13 is a frequency distribution chart which shows a relationship between a length of the temporary line and a frequency.

In order to distinguish the horizontal temporary lines from the vertical temporary lines, the line length data 24L is read from the temporary line table 24 to prepare a frequency list 26 which represents a frequency of temporary line (number of lines appeared) for each line segment (step 502). FIG. 13 shows an example of the frequency list 26. In the image which includes vertical and horizontal ruled lines, if the horizontal lengths are mesured and the frequency distribution of the temporary lines is prepared, short ruled lines which constitute the vertical ruled lines have high frequencies because the vertical ruled lines are divided into a number of line segments having short line lengths. For example, if each vertical ruled line has a line width equal to one pixel width, the frequency of the temporary lines having one-pixel line length is maximum. If the line width of the vertical ruled lines is equal to two-pixel width, the frequency of the temporary lines having two-pixel line length is maximum. Accordingly, the line length l for the maximum frequency is regarded as the line width of the vertical ruled lines, and the line length l or the line length l multiplied by a predetermined coefficient k (for example, k=2) is stored in the memory area 27 as a threshold TH for discriminating the horizontal temporary lines from the vertical temporary lines.

The temporary line table 24 may be editted into a form which includes only the temporary data having larger line length 24L than the threshold TH, that is, only the horizontal temporary line data and does not include the vertical temporary line data. In the present embodiment, a temporary line consolidation step 504 is carried out while the vertical temporary line data is left in the temporary line table.

On the temporary table 24, the horizontal ruled lines LH1, LH2, . . . are stored as temporary line data. In the step 504, a plurality of adjacent horizontal temporary lines are consolidated to convert them to solid line data which represents one horizontal ruled line having a line width equal to a plurality of pixels.

Figure 14:
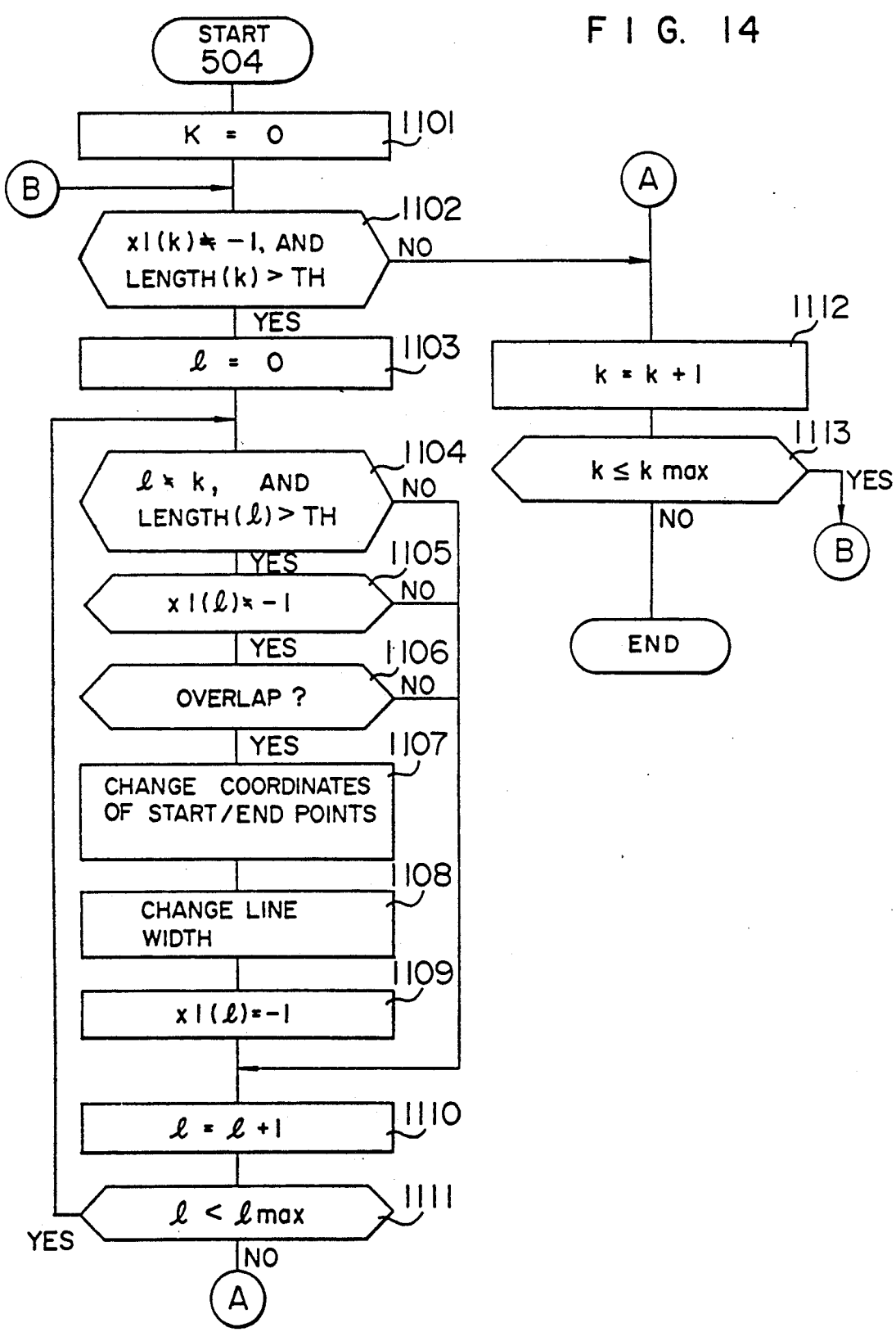
FIG. 14 shows a detailed flow chart of a temporary line consolidation routine 504 of FIG. 11, FIGS. 15 and 16 show definitions of rules for consolidating the temporary line.

FIG. 14 shows a flow chart of a detailed horizontal temporary line consolidation process in the step 504. The start point coordinate 24S of the k-th temporary line in the temporary line table 24 is represented by [xl(k), yl(k)], the end point coordinate 24E is represented by [x2(k), y2(k)], the line width 24W is represented by Width (k), and the line length 24L is represented by Length (k).

In the flow chart of FIG. 14, one horizontal temporary line in the temporary line list 24 is selected as a reference temporary line, and all other horizontal temporary lines are sequentially checked as to whether they contact to the reference temporary line. If the temporary line contacts to or overlaps with the reference temporary line, the start point, end point, line width and line length of the reference temporary line are updated (consolidation of the temporary line and the reference temporary line) in accordance with the definitions shown in FIGS. 15 and 16, and the data of the consolidated temporary line is erased from the temporary line list 24.

In FIG. 14, k is a parameter representing the reference temporary line and l is a parameter representing the temporary line to be compared. In steps 1101 and 1113, a loop is formed for one k, and in steps 1103 and 1111, a loop is formed for one l. In the present example, the consolidated temporary line is not erased from the list but "−1" is substituted in the x-coordinate of the start point. In steps 1102 and 1104, the length of the reference temporary line (Length (k)) and the length of the temporary line to be compared (Length (l)) are compared with the threshold TH. If it is smaller than TH, it is omitted from the comparison. If the vertical temporary line data has been previously erased from the temporary line table, the comparison with the threshold TH may be omitted.

In this routine, k is initialized in a step 1101. In a step 1102, whether the k-th temporary line data is valid as the reference temporary line is checked. If the k-th data has been essentially erased or corresponds to a vertical temporary line, the process proceeds to a step 1112 where k is incremented by one. If k after the increment exceeds the maximum number of data k max stored in the temporary line table 24, the routine is terminated (step 1113). Otherwise, the process returns to the step 1102. In the step 1102, if the k-th temporary line data is valid as the reference temporary line, the parameter l representing the temporary line to be compared is initialized in a step 1103. In steps 1104 and 1105, whether the l-th temporary line data is valid or not is checked. If it is not valid, l is incremented by one in a step 1110. If the incremented l does not exceed the number of data lmax (=kmax) of the temporary line list, the process returns to the step 1104. Otherwise, the process proceeds to a step 1112. If the l-th data is valid, a positional relationship between the reference temporary line and the temporary line to be compared is checked. If those two temporary lines overlap or contact to each other, the coordinates of the start point and the end point of the reference temporary line are changed (step 1107) and the line width is changed (step 1108), and the x-coordinate of the start point is changed to "−1" to represent the erasure of the temporary data to be compared.

FIG. 15 shows definition of change of the x-coordinate xl(k) of the start point and the x-coordinate x2(k) of the end point of the reference temporary line when the reference temporary line (k-th temporary line) and the temporary line (l-th temporary line) to be compared contact to each other or overlap. When the start point or end point of the temporary line to be compared is outside the reference temporary line, the x-coordinate of the start point or end point of the reference temporary line is replaced by the x-coordinate of the start point or end point of the temporary line to be compared. If the reference temporary line and the temporary line to be compared are consolidated, the x-coordinate of the start point or end point of the reference temporary line is changed and the line width is also changed so that it gradually grows.

Figures 17, 18, 19:
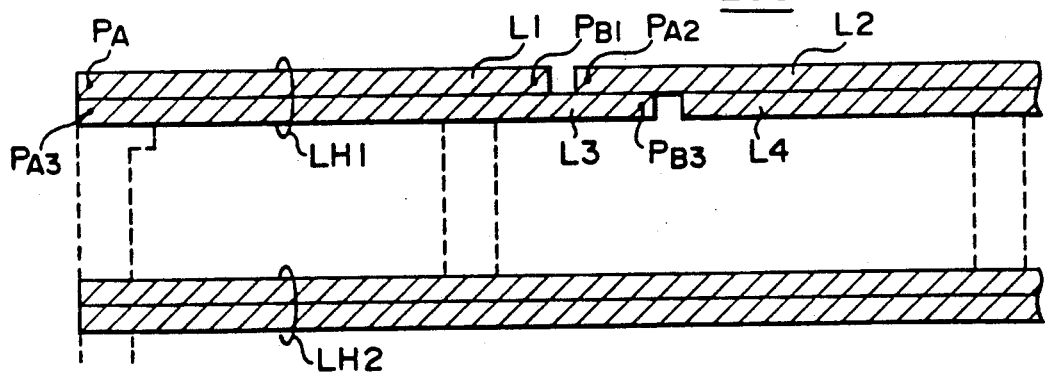
FIG. 17 shows a specific procedure of the temporary line consolidation.
FIG. 18 shows a status of a temporary line table in a course of the temporary line consolidation process.
FIG. 19 shows a content of a table which stores defining data for a ruled line (solid line) which is generated by consolidating a plurality of temporary lines.

For example, in the image of FIG. 17, if L1 is selected as the reference temporary line, the temporary line L2 does not overlap and it remains in the temporary line list. Since the temporary line L3 overlaps with the reference temporary line, it is consolidated into the reference temporary line and the coordinate of the end point of the reference temporary line L1 is changed from $P_{B1}$ to $P_{B3}$ in a step 1107. The line width of the reference temporary line L1 is changed to "2" in a step 1108, and the data of the temporary line L3 is erased in a step 1109. Since the temporary line L4 does not overlap with the reference temporary line whose line width has been widened, it remains in the temporary line list at this moment.

After all temporary lines have been compared with the reference temporary line L1, the temporary line L2 is next selected as the reference temporary line. The new reference temporary line L2 is compared with the temporary line L1 which has already been consolidated with L3. Since they overlap, the coordinate $P_{A2}$ of the start point of L2 is changed to $P_{A1}$. The line width of L2 is changed to "2" and the temporary line L1 is erased from the temporary line list. Then, the temporary line L4 is selected as the temporary line to be compared. It is also consolidated with the reference temporary line L2. Thus, the temporary line L1-L4 are consolidated into one solid line.

FIG. 16 shows definition of change of the line width when the reference temporary line k and the temporary line 1 to be compared overlap. The two line segments having the line widths W(k) and W(l) may overlap in one of the three ways shown in FIG. 16. Except for the third case where the temporary line to be compared is completely hidden by the reference temporary line, the following relationship exists.

$$Width(k) = y2(l) - y1(k) + 1$$

The content of the horizontal temporary line table 24 shown in FIG. 12 is changed to the one shown in FIG. 18 by the data processing described above.

Figure 10:
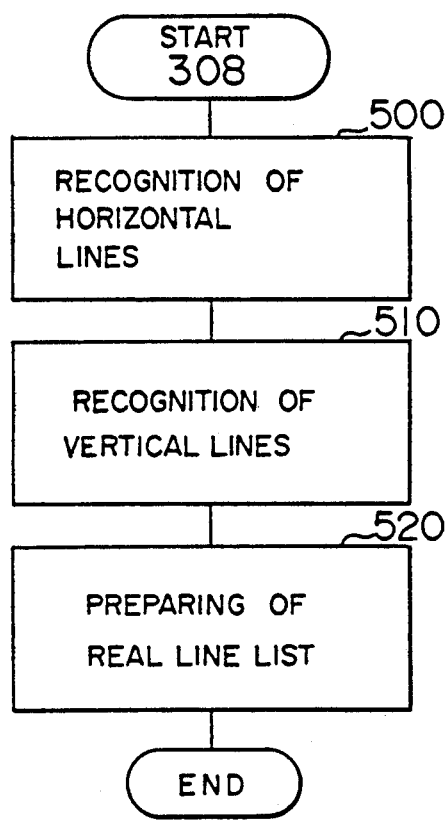
FIG. 10 shows a detailed flow chart of a ruled line recognition routine 308 of FIG. 3.

In the vertical line recognition routine 510 of FIG. 10, x's in the horizontal line detection routine are replaced by y's and the temporary line data produced by vertically scanning the image 203 is stored in the vertical temporary line table 25, and a similar process to that of FIG. 14 is applied to the temporary line data. A threshold TH' for discriminating the vertical temporary lines from the horizontal temporary lines is stored in the memory area 28.

In the solid line list preparation step 520 of FIG. 10, the consolidated horizontal temporary line data stored in the horizontal temporary line table 24 and the consolidated vertical temporary line data stored in the vertical temporary line table 25 are written into the ruled line table (solid line list) 22. In this process, the horizontal temporary line data stored in the horizontal temporary line table 24 are sequentially read, and only those which have values other than "−1" at the x-coordinate of the start point or whose line lengths 24W are larger than the threshold TH are selected and sequentially transferred to the ruled line table 22 as shown in FIG. 19. Then, the vertical temporary line data stored in the vertical temporary line table 25 are sequentially read, and the x-coordinate of the start point is checked and the line width is compared with the threshold TH' so that only valid data are sequentially added to the ruled line table 22. The number of horizontal line data HNO, the number of vertical line data VNO and the total number of data TOTAL stored in the ruled line table 22 are counted. In the ruled line table 22, the horizontal line data group and the vertical line data group may be discriminated by checking the x-coordinates of the start points and the end points If the x-coordinates of the start point and the end point are equal, it is the vertical line data.

Figure 20:
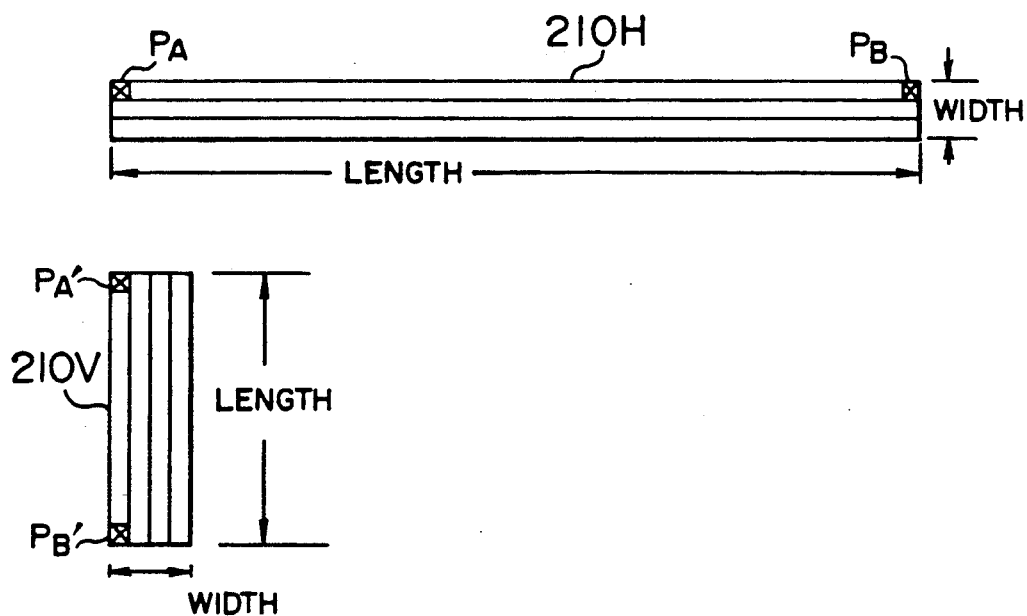
FIG. 20 shows a start point and an end point in the ruled line defining data.

FIG. 20 shows a relationship among the start point data 22S and the end point data 22E stored in the ruled line table 22 and the actual position on the ruled line. For the horizontal ruled line 210H, the start point data 22S and the end point data 22E designate the opposite ends $P_A$ and $P_B$ of the top temporary line. On the other hand, for the vertical ruled line 210V, the data designates the opposite ends $P_A'$ and $P_B'$ of the left temporary line.

FIGS. 21A and 21B show detail of the crosspoint processing routine 310 of FIG. 3. The ruled line data in the ruled line table 22 includes data of vertical lines or horizontal lines which extend beyond the frame as shown by 213' in FIG. 2. In the crosspoint processing routine, errors at the crosspoints of the vertical lines and the horizontal lines are detected and the end point coordinates of the projecting portions are corrected. It comprises a horizontal line correction process (FIG. 21A) and a vertical line correction process (FIG. 21B).

In the horizontal line correction process, the x-coordinate of the end point of the horizontally projecting line segment is changed to conform to the position of the vertical line which crosses the horizontal line under consideration. The y-coordinates of the start point and the end point of the horizontal line are not changed but only the x-coordinate are changed. The horizontal lines whose coordinates are to be corrected are sequentially selected from the ruled line table 22, and the vertical lines whose x-coordinates are close to the x-coordinates of the start points of the horizontal lines are searched. The decision as to whether it is "close" or not is done by using the threshold TH used to discriminate the vertical temporary lines and the horizontal temporary lines as one of references. If a vertical line is found whose x-coordinate distance to the horizontal line under consideration is within the threshold TH, the x-coordinate of that vertical line is selected as a new x-coordinate of the horizontal line. As to the end point, the vertical line whose x-coordinate is close is searched and the x-coordinate of the horizontal line is substituted by the x-coordinate of the vertical line. The above process is repeated for all horizontal lines so that the projecting portions of the horizontal ruled lines are eliminated.

On the other hand, in the vertical line correction process, the x-coordinates are not changed but only the y-coordinates are changed. The vertical lines to be corrected are sequentially selected, and horizontal lines whose y-coordinates are close to the start points and the end points of the vertical lines are searched, and the y-coordinates of the vertical lines are substituted by the y-coordinates of the horizontal lines.

FIG. 21A shows a flow chart of the horizontal line correction process, in which i denotes a suffix for the horizontal line, j denotes a suffix for the vertical line and L denotes the threshold TH determined in the step 503. In a step 1403, a vertical line having an x-coordinate which is close to a start point xl(i) of a horizontal line is searched.

$$xl(j) - L \leq xl(i) \leq xl(j) + L$$

If the start point xl(i) is within the above range, xl(i) is changed to xl(j) in a step 1404. In steps 1405-1406, the end point is processed in the same manner as that of the start point. In a step 1407, the line length is changed due to the change of the start or end point.

FIG. 21B shows a flow chart of the vertical line correction process. In essence, the algorithm is the same except for the exchange of x and y compared with FIG. 21A. In steps 1423–1424, the start point is changed, in steps 1425–1426, the end point is changed, and in a step 1427, the line length is changed.

Figure 22:
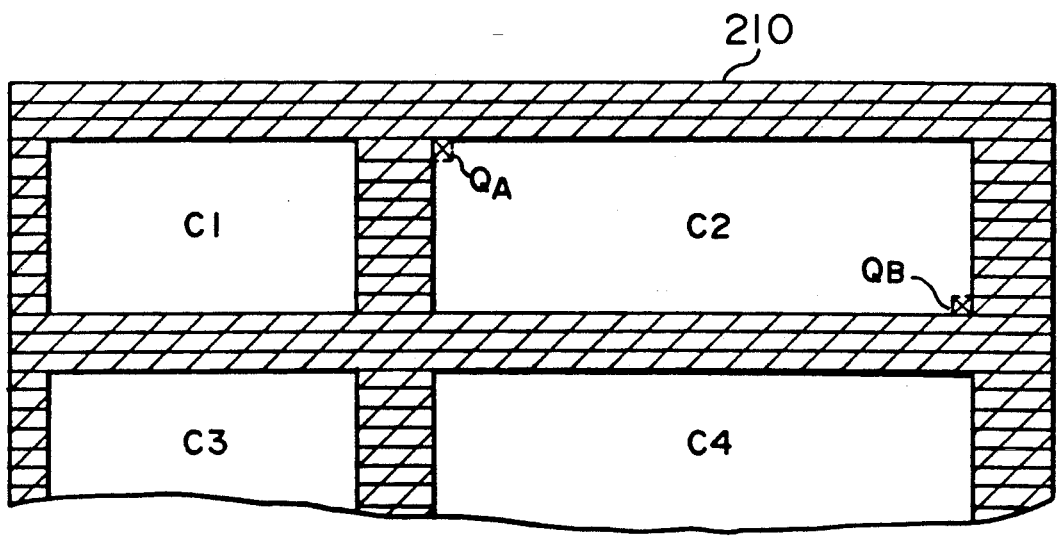
FIG. 22 shows a start point and an end point in section defining data.

Detail of the section recognition process 312 of FIG. 3 is now explained. As shown in FIG. 22, the section is defined as a cell area C1e, C2, C3, C4, . . . enclosed by two vertical ruled lines 210 and two horizontal ruled lines 210. The size and position of the section are defined by the left top pixel (start point) $Q_A$ and the right bottom pixel (end point $Q_B$ of the cell area. In the present invention, in order to discriminate the start point and the end point of the ruled line, the coordinates of the section start point $\theta_A$ are represented by (cell-x1, cell-y1) and the coordinates of the end point $\theta_B$ are represented by (cell-x2, cell-y2).

FIG. 23 specifically illustrates the section recognition process. The ruled lines 210 comprise horizontal lines H1, H2, . . . H7 sequentially numbered from the top and vertical lines V1, V2, . . . V5 sequentially numbered from the left. In the section recognition process 312, the cell areas C1–C13 enclosed by the ruled lines at the left, right, top and bottom boundaries are sequentially recognized, and the coordinates of the start points and the end points of the areas are stored into the section table 23. In recognizing the cell area, the first horizontal line H1 is first selected as a reference line and the vertical lines are sequentially checked starting from the left line to detect two vertical lines V1 and V3 which cross the reference line and form a left side segment and a right side segment of the section. Then, a horizontal line H3 which crosses the vertical lines V1 and V3 and which is closest to the reference line H1 and forms the lower side segment of the section is searched. The area enclosed by H1, V1, V3 and H2 is recognized as a first section (cell number C1). After the section has been recognized, the coordinates of the start point $\theta_A$ and the end point $\theta_B$ defined in FIG. 22 are determined and they are registered into the section table 23. Then, a vertical line V5 which is to form a right side segment of a cell area having the reference line H1 as the upper side segment and the vertical line V3 as the left side segment is searched and a horizontal line H2 which is to form a lower side segment crossing the vertical lines V3 and V5 is searched. The area enclosed by H1, V3, V5 and H2 is recognized as a second section (cell number C2). If the right side segment of the recognized cell area is the rightmost vertical line, no more section which includes the reference line H1 as the upper side segment exists. Accordingly, the second horizontal line is selected as the reference line and the above check process is repeated to recognize the cell areas C3, C4, . . . C11. When the reference line reaches the bottom horizontal line, the process is terminated.

FIG. 24 shows the sequence 241 of recognition of the cell areas in FIG. 23 and a relationship among the ruled lines corresponding to the upper side segment 242, the left side segment 243, the right side segment 244 and the lower side segment 245 which define the cell area.

Figure 25:
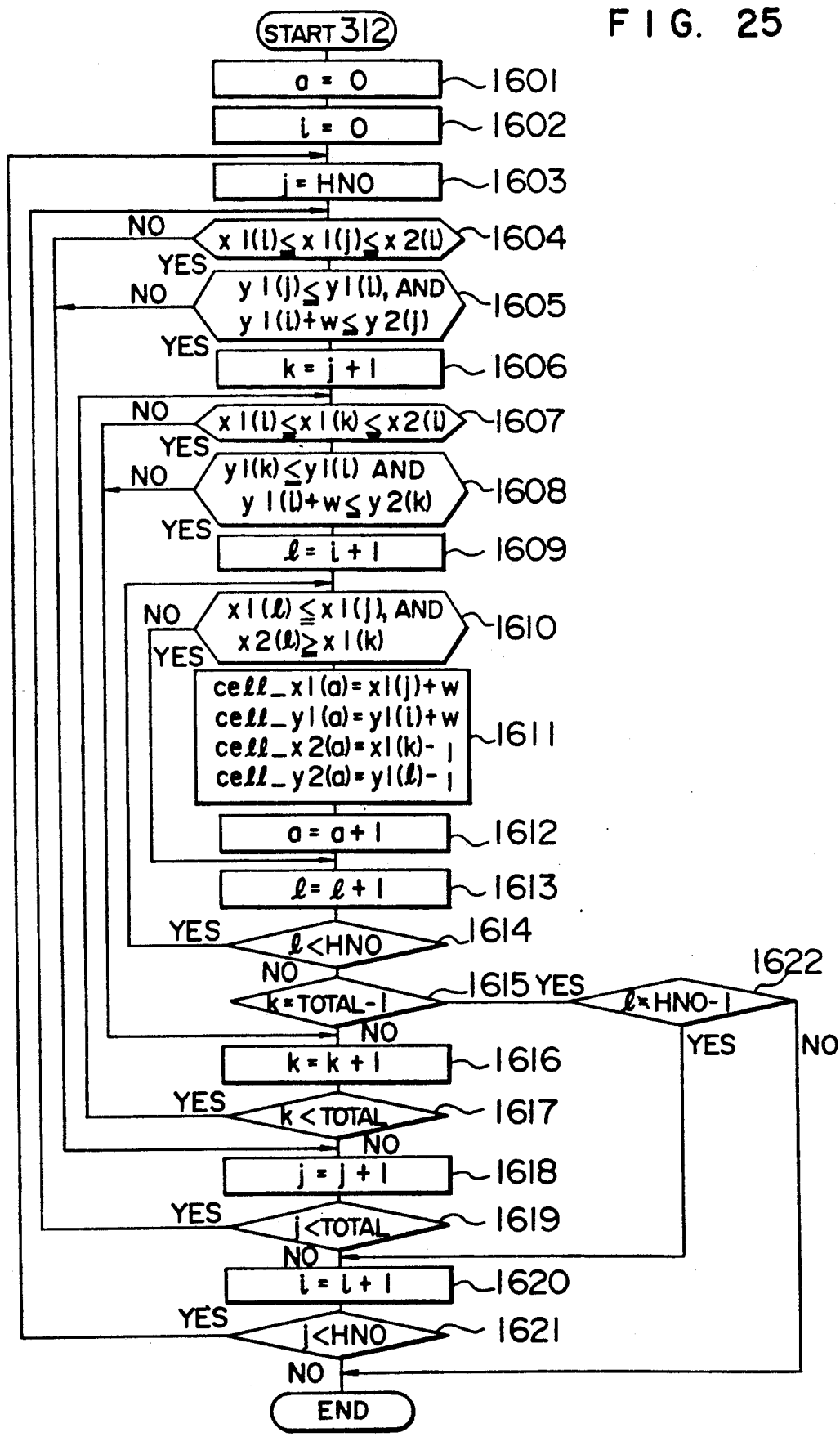
FIG. 25 shows a detailed flow chart of a section recognition routine 312 of FIG. 3.

FIG. 25 shows a detailed program flow chart of the section recognition process. In this flow chart, a suffix i is used for the first horizontal line, a suffix j is used for the first vertical line, a suffix k is used for the second horizontal line and a suffix l is used for the second vertical line. In order to simplify the explanation, it is assumed that the line width of all ruled lines is W, and a suffix for the section number is a, the left top point of the a-th section is represented by (cell-x1(a), cell-y1(a)), and the right bottom point is represented by (cell-x2(a), cell-y2(a)).

In FIG. 25, the first vertical line, that is a candidate for the left side segment of the section is searched in steps 1604–1605. In steps 1607–1608, the second vertical lines, that is, a candidate for the right side segment of the section is searched. In a step 1610, the second horizontal line, that is, a candidate for the lower side segment of the section is searched. In a step 1611, the left top point and the right bottom point of the section are defined and the coordinate data is stored in the section table 23. The x-coordinate of the left top point is equal to (the x-coordinate of the left side sigment) + (the line width), and the y-coordinate is equal to (the y-coordinate of the upper side segment) + (the line width). The x-coordinate of the right bottom point is equal to (the x-coordinate of the right side segment) −1, and the y-coordinate is equal to (the y-coordinate of the lower side segment) −1.

FIG. 26 shows an example of the section table 23. Numeral 23N denotes a section (cell area) number, numeral 23S denotes a start point coordinate and numeral 23E denotes an end point coordinate.

In accordance with the embodiments of the present invention described above, a slip which includes both characters and ruled lines is inputted as an image signal, only the ruled lines are automatically extracted and they are converted to vector data. The sizes and the positions of the sections defined by the ruled lines are automatically recognized and the section defining data is stored in the table. Accordingly, in accordance with the present invention, even if the ruled lines are deteriorated in the image input device or even if the slip form includes deteriorated ruled lines due to reproduction, sharp ruled lines can be reproduced by the vector data. Further, since the ruled lines are converted to the vector data, the position, length or width of any ruled line can be partially amended, or a new ruled line may be added or the existing ruled line may be deleted in response to a command input and a cursor manipulation through a keyboard while utilizing a document edition function which a conventional document edition terminal or word processor has.

In a modification of the present invention, the line width of all ruled lines may be unified to a predetermined width in the crosspoint processing step 310 or the section recognition step 312 of FIG. 3. The line width may be determined by determining the frequencies of the line widths of all ruled lines in the ruled line table 22 and selecting the line width having the maximum frequency, or by selecting n standard line widths having high frequencies and selecting the line width of each ruled line to the closest one of the standard line widths.

The character frame data extracted in the character circumscribed rectangular frame (character frame) recognition process 306 of FIG. 3 may be stored in the character frame table prepared for the ruled line table 22, and the ruled lines and the character frame may be displayed in overlap in the display step 309 or a display step subsequent to the step 319. In this method, the operator may enter the characters and codes from the keyboard while he/she moves the cursor to the character position in the original input image.

We claim:

1. A method for processing a document in a document processor having image input means and display means, comprising:
   a first step of converting a document including a plurality of characters and a table having a plurality of vertical and horizontal ruled lines into a document image by said image input means;
   a second step of converting the document image into a second document image including only the ruled lines;
   a third step of scanning said second document image to detect and store vector data of a plurality of line segments each comprising said ruled lines and including one or more of successive black pixels arranged on a scan line in a direction;
   a fourth step of determining a threshold value of successive black pixels for distinguishing horizontal ruled lines form vertical ruled lines in said second document image, based on frequencies of line segment length in the second document image calculated from said stored vector data of the line segments;
   a fifth step of extracting horizontal ruled lines and vertical ruled lines from said second document image on the basis of said threshold value of successive black pixels and said stored vector data of the line segments to obtain vector data defining respective ruled lines; and,
   a sixth step of drawing on a screen of said display means a table form comprising a plurality of ruled lines drawn on the basis of said vector data of the ruled lines.

2. The method for processing a document according to claim 1 wherein said second step includes a step of determining circumscribed rectangles of respective successive black pixel areas included in the document image, and a step of substituting black pixels located in each circumscribed rectangle having smaller size than a predetermined size on the document image, with white pixels.

3. The method for processing a document according to claim 1 wherein said fifth step includes a step of extracting a plurality of horizontal ruled lines from the second document image to generate vector data representing start points, end points and line widths of respective horizontal ruled lines, and a step of extracting a plurality of vertical ruled lines from the second document image to generate vector data representing start points, end points and line width of respective vertical ruled lines.

4. The method for processing a document according to claim 3 wherein said horizontal ruled lines are extracted by excluding form a plurality of line segments each having one or more black pixels detected by sequentially scanning the second document image in a horizontal direction, those line segments each comprising less number of black pixels than said threshold value, and wherein the vertical ruled lines are extracted by excluding from a plurality of line segments each having one or more black pixels, detected by sequentially scanning the second document image in a vertical direction, those line segments each comprising less number of black pixels than said threshold value.

5. The method for processing a document according to claim 4 wherein the vector data of the horizontal ruled lines are generated by consolidating those line segments extracted by the horizontal scan, which are in adjacent positional relationship into one line segment having an increased line width and/or length and by detecting a start point, an end point and a line width of the consolidated line segment, and the vector data of the vertical ruled lines are generated by consolidating those line segments extracted by the vertical scan, which are in adjacent positional relationship, into one line segment having an increased line width and/or line length and detecting a one of the start points, a one of the end points and line width of the consolidated line segment.

6. The method for processing a document according to claim 3 further comprising a step of comparing the vector data representing the vertical ruled lines, with the vector data representing the horizontal ruled lines of the vector data generated in said third step to selectively correct the start points and the end points.

7. The method for processing a document according to claim 1 further comprising a step of detecting a skew of the document image generated in said first step to correct the skew, wherein said second step is carried out for the skew-corrected document image.

8. The method for processing a document according to claim 1 further comprising a step of detecting a plurality of sections constituting the table and having upper, lower, left and right side segments therefor sectioned by ruled lines based on the vector data of said ruled lines generated in said fifth step.

* * * * *

UNITED STATES PATENT AND TRADEMARK OFFICE
CERTIFICATE OF CORRECTION

PATENT NO. : 5,101,448
DATED : March 31, 1992
INVENTOR(S) : Sachiko Kawachiya, et al.

It is certified that error appears in the above-identified patent and that said Letters Patent is hereby corrected as shown below:

Claim 1, column 15, line 19, delete "form" and replace with --from--.

Claim 4, column 16, line 5, delete "form" and replace with --from--.

Signed and Sealed this

First Day of June, 1993

Attest:

MICHAEL K. KIRK

*Attesting Officer*   Acting Commissioner of Patents and Trademarks